United States Patent
Zhou et al.

(10) Patent No.: US 11,677,345 B2
(45) Date of Patent: Jun. 13, 2023

(54) CONTROL METHOD AND SYSTEM FOR CONTINUOUS HIGH AND LOW VOLTAGE RIDE THROUGH OF PERMANENT-MAGNET DIRECT-DRIVE WIND-DRIVEN GENERATOR SET

(71) Applicant: XINJIANG GOLDWIND SCIENCE & TECHNOLOGY CO., LTD., Urumqi (CN)

(72) Inventors: Jie Zhou, Beijing (CN); Yuanyan Huang, Beijing (CN); Chengzhi Qin, Beijing (CN); Shaohua Zhang, Beijing (CN); Xin Chen, Beijing (CN)

(73) Assignee: XINJIANG GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 0 days.

(21) Appl. No.: 17/757,294

(22) PCT Filed: Jun. 8, 2020

(86) PCT No.: PCT/CN2020/094917
§ 371 (c)(1),
(2) Date: Jun. 13, 2022

(87) PCT Pub. No.: WO2021/114589
PCT Pub. Date: Jun. 17, 2021

(65) Prior Publication Data
US 2023/0016646 A1 Jan. 19, 2023

(30) Foreign Application Priority Data
Dec. 13, 2019 (CN) .................. 201911279792.X

(51) Int. Cl.
*H02P 9/10* (2006.01)
*F03D 7/02* (2006.01)
(Continued)

(52) U.S. Cl.
CPC .............. *H02P 9/105* (2013.01); *F03D 7/028* (2013.01); *F05B 2270/1033* (2013.01); *H02P 2101/15* (2015.01); *H02P 2103/20* (2015.01)

(58) Field of Classification Search
CPC .. H02P 9/105; H02P 2101/15; H02P 2103/20; F03D 7/028; F05B 2270/1033
See application file for complete search history.

(56) References Cited

U.S. PATENT DOCUMENTS

2017/0146603 A1 * 5/2017 Qin .................... H02P 9/102

FOREIGN PATENT DOCUMENTS

| CN | 103972921 A | 8/2014 |
| CN | 105633998 A | 6/2016 |

(Continued)

OTHER PUBLICATIONS

CN 108134404 A English translation (Year: 2018).*

(Continued)

*Primary Examiner* — Viet P Nguyen
(74) *Attorney, Agent, or Firm* — Bayes PLLC

(57) ABSTRACT

The present application provides a method and a system for controlling continuous high voltage ride-through and low voltage ride-through of a permanent magnet direct-driven wind turbine. The method includes: determining a transient time period during which the wind turbine is transitioned from a high voltage ride-through state to a low voltage ride-through state; controlling the wind turbine to provide, during the transient time period, a gradually increasing active current to the point of common coupling; and controlling the wind turbine to provide, during the transient time period, a reactive current to the point of common coupling according to an operation state of the wind turbine before the high voltage ride-through state.

18 Claims, 5 Drawing Sheets

(51) Int. Cl.
*H02P 101/15* (2016.01)
*H02P 103/20* (2016.01)

(56) References Cited

FOREIGN PATENT DOCUMENTS

| | | | |
|---|---|---|---|
| CN | 106611965 | A | 5/2017 |
| CN | 107846042 | A | 3/2018 |
| CN | 108134404 | A | 6/2018 |
| CN | 108155665 | A | 6/2018 |
| CN | 108206535 | A | 6/2018 |
| CN | 108471120 | A | 8/2018 |
| CN | 108595861 | A | 9/2018 |
| CN | 108599256 | A | 9/2018 |
| CN | 109193753 | A | 1/2019 |
| CN | 109617125 | A | 4/2019 |
| CN | 108054786 | B | 7/2019 |
| CN | 110165705 | A | 8/2019 |
| CN | 110535189 | A | 12/2019 |

OTHER PUBLICATIONS

Indian Office Action in related Indian Application No. 202217033442, dated Oct. 19, 2022 (6 pages).
Notice of Registration in related Chinese Application No. 201911279792. X, dated Nov. 11, 2022 (8 pages).
Reexamination Decision in related Chinese Application No. 201911279792.X, dated Oct. 28, 2022 (2 pages).
Rejection Decision in related Chinese Application No. 201911279792. X, dated Jul. 1, 2022 (5 pages).
International Search Report in corresponding International Application No. PCT/CN2020/094917 dated Aug. 17, 2020 (11 pages).
Office Action in corresponding Chinese Application No. 201911279792.X dated Mar. 10, 2022 (15 pages).
Tian et al., "Analysis of transient stability of power system system for direct-drive wind farm", ElECTRONIC Measurement Technology, vol. 40 Issue 1, Jan. 2017 (5 pages).

* cited by examiner

CONTROL METHOD AND SYSTEM FOR CONTINUOUS HIGH AND LOW VOLTAGE RIDE THROUGH OF PERMANENT-MAGNET DIRECT-DRIVE WIND-DRIVEN GENERATOR SET

CROSS-REFERENCE TO RELATED APPLICATIONS

This application is a national stage of International Application No. PCT/CN2020/094917, filed on Jun. 8, 2020 which claims priority to Chinese Patent Application No. 201911279792.X filed on Dec. 13, 2019. The entire contents of each of the above-identified applications are expressly incorporated herein by reference.

TECHNICAL FIELD

The application relates to the field of wind power generation technologies, and in particular, to a method and system for controlling continuous high voltage ride-through and low voltage ride-through of a permanent magnet direct-driven wind turbine.

BACKGROUND

A permanent magnet direct-driven wind turbine adopts a variable-speed and constant-frequency wind power generation technology which uses a non-speed-increasing gearbox and an impeller to directly drive a multi-pole low-speed permanent magnet synchronous generator, and is connected to a power grid via a full-power converter in order to achieve complete decoupling of the wind turbine with the power grid. The coupling characteristics of the wind turbine are mainly depend on technical performance of the converter at its grid side.

When a voltage at a point of common coupling of a wind farm is decreased or increased due to a fault or disturbance in the power system, it is necessary for the wind turbine to perform low voltage ride-through or high voltage ride-through in order to keep the wind turbine to be connected with the power grid and run continuously. The capability of the permanent magnet direct-driven wind turbine to perform the low-voltage ride-through and high-voltage ride-through is mainly reflected in following two aspects: during the voltage ride-through, a voltage of a direct current (DC) bus is kept stable by a braking unit connected in parallel with the DC bus so as to keep an active power output stable; and during the voltage ride-through, the grid-side converter supports rapid recovery of a voltage of the power grid by rapidly outputting a reactive current.

In related arts, during the low voltage ride-through or high voltage ride-through of the wind turbine, only a transient reactive power support is provided according to a degree of increase or decrease of the voltage of the power grid and a reactive power provided before the ride-through. There is no disclosure in the related arts about a controlling method for the wind turbine to provide, in processes of continuous low voltage ride-through and high voltage ride-through, active power and reactive power supports when being transitioned from the high voltage ride-through to the low voltage ride-through.

SUMMARY

Embodiments of the application provide a method and a system for controlling continuous high voltage ride-through and low voltage ride-through of a permanent magnet direct-driven wind turbine, which can effectively support grid voltages.

In a first aspect, the embodiments of the application provide a method for controlling continuous high voltage ride-through and low voltage ride-through of a permanent magnet direct-driven wind turbine. The method includes: monitoring a voltage at a point of common coupling of a wind farm; determining a transient time period during which the wind turbine is transitioned from a high voltage ride-through state to a low voltage ride-through state; controlling the wind turbine to provide, during the transient time period, a gradually increasing active current to the point of common coupling; and controlling the wind turbine to provide, during the transient time period, a reactive current to the point of common coupling according to an operation state of the wind turbine before the high voltage ride-through state.

In an embodiment of the application, the controlling the wind turbine to provide, during the transient time period, the gradually increasing active current to the point of common coupling includes: superimposing an active current increasing at a preset recovery rate on an active current provided by the wind turbine to the point of common coupling in the high voltage ride-through state.

In an embodiment of the application, the controlling the wind turbine to provide, during the transient time period, the reactive current to the point of common coupling according to the operation state of the wind turbine before the high voltage ride-through state includes: controlling the wind turbine to provide a zero reactive current to the point of common coupling under a condition that the wind turbine provides a zero reactive power to the point of common coupling before the high voltage ride-through; controlling the wind turbine to provide a gradually increasing capacitive reactive current to the point of common coupling under a condition that the wind turbine provides a capacitive reactive power to the point of common coupling before the high voltage ride-through; and controlling the wind turbine to provide a step change to an inductive reactive current of the wind turbine before the high voltage ride-through to the point of common coupling under a condition that the wind turbine provides an inductive reactive power to the point of common coupling before the high voltage ride-through.

In an embodiment of the application, the controlling the wind turbine to provide the gradually increasing capacitive reactive current to the point of common coupling includes: controlling an increase rate of the capacitive reactive current to be consistent with an increase rate of an output active power of the wind turbine; and controlling the wind turbine to provide the gradually increasing capacitive reactive current to the point of common coupling according to the increase rate of the capacitive reactive current.

In an embodiment of the application, the determining the transient time period during which the wind turbine is transitioned from the high voltage ride-through state to the low voltage ride-through state includes: determining that the transient time period begins if the monitored voltage at the point of common coupling is decreased as compared with a voltage at the point of common coupling at beginning of the high voltage ride-through of the wind turbine and a decrease amount is not less than a preset threshold; and determining that the transient time period ends if the monitored voltage at the point of common coupling is decreased to a preset low voltage ride-through threshold.

In an embodiment of the application, the method further includes: controlling the wind turbine to enter the low voltage ride-through state after completion of the transient time period, and to provide a capacitive reactive power to the point of common coupling according to a degree of decrease of the voltage at the point of common coupling and a reactive power of the wind turbine before the high voltage ride-through.

In a second aspect, the embodiments of the application provide a system for controlling continuous high voltage ride-through and low voltage ride-through of a permanent magnet direct-driven wind turbine. The system includes: a monitoring module configured to monitor a voltage at a point of common coupling of a wind farm; and a controller configured to determine a transient time period during which the wind turbine is transitioned from a high voltage ride-through state to a low voltage ride-through state; control the wind turbine to provide, during the transient time period, a gradually increasing active current to the point of common coupling; and control the wind turbine to provide, during the transient time period, a reactive current to the point of common coupling according to an operation state of the wind turbine before the high voltage ride-through.

In an embodiment of the application, the controller is specifically configured to superimpose an active current increasing at a preset recovery rate on an active current provided by the wind turbine to the point of common coupling in the high voltage ride-through state.

In an embodiment of the application, the controller is specifically configured to: control the wind turbine to provide a zero reactive current to the point of common coupling under a condition that the wind turbine provides a zero reactive power to the point of common coupling before the high voltage ride-through; control the wind turbine to provide a gradually increasing capacitive reactive current to the point of common coupling under a condition that the wind turbine provides a capacitive reactive power to the point of common coupling before the high voltage ride-through; and control the wind turbine to provide a step change to an inductive reactive current of the wind turbine before the high voltage ride-through to the point of common coupling under a condition that the wind turbine provides an inductive reactive power to the point of common coupling before the high voltage ride-through.

In an embodiment of the application, the controller is specifically configured to: control an increase rate of the capacitive reactive current to be consistent with an increase rate of an output active power of the wind turbine; and control the wind turbine to provide the gradually increasing capacitive reactive current to the point of common coupling according to the increase rate of the capacitive reactive current.

In an embodiment of the application, the controller is further configured to: determine that the transient time period begins if the monitored voltage at the point of common coupling is decreased as compared with a voltage at the point of common coupling at beginning of the high voltage ride-through of the wind turbine and a decreased amount is not less than a preset threshold; and determine that the transient time period ends if the monitored voltage at the point of common coupling is decreased to a preset low voltage ride-through threshold.

In an embodiment of the application, the controller is further configured to: control the wind turbine to enter the low voltage ride-through state after completion of the transient time period, and to provide a capacitive reactive power to the point of common coupling according to a degree of decrease of the voltage at the point of common coupling and a reactive power of the wind turbine before the high voltage ride-through.

In a third aspect, the embodiments of the application provide a computer-readable storage medium having computer program instructions, which implement, when being executed by a processor, the method according to the first aspect or any one of the embodiments of the application.

In the method and system for controlling continuous high voltage ride-through and low voltage ride-through of a permanent magnet direct driven wind turbine according to the embodiments of the present application, the wind turbine is controlled to provide a gradually increasing active current to the point of common coupling during the transient time period within which the wind turbine is transitioned from the high voltage ride-through to the low voltage ride-through, which can prevent an impact on the power grid caused by an instantaneous increase of the active power, and thus the voltage of the power grid can be effectively supported. Moreover, as an comparison, in a solution that uses an reactive current provided before the low voltage ride-through to provide reactive power supports to the power grid, since the reactive current provided before the low voltage ride-through is of a value during transition from the high voltage ride-through to the low voltage ride-through, the reactive current may not be an reactive current actually required by the power grid. Therefore, in the embodiments of the present application, the wind turbine is controlled to provide, during the transient time period, a reactive current to the point of common coupling according to an operation state of the wind turbine before the high voltage ride-through, so that a reactive current can be provided according to actual requirements of the power grid, which avoids that the voltage of the power grid cannot be recovered due to insufficient or excess reactive power for the low voltage ride-through, and therefore the voltage of the power grid can be effectively supported.

BRIEF DESCRIPTION OF DRAWINGS

In order to illustrate the technical solutions of the embodiments of the present application more clearly, the following briefly introduces the accompanying drawings that need to be used in the embodiments of the present application. For those of ordinary skill in the art, without creative work, the Additional drawings can be obtained from these drawings.

DETAILED DESCRIPTION

The features and exemplary embodiments of various aspects of the present application will be described in detail below. In order to make the purpose, technical solutions and advantages of the present application more clear, the present application will be further described in detail below with reference to the accompanying drawings and embodiments. It should be understood that the specific embodiments described herein are only intended to explain the present application, but not to limit the present application. It will be apparent to those skilled in the art that the present application may be practiced without some of these specific details. The following description of the embodiments is merely to provide a better understanding of the present application by illustrating examples of the present application.

In this document, relational terms such as "first" and "second", etc. are used only to distinguish one entity or operation from another entity or operation, and do not necessarily require or imply any such actual relationship or sequence between these entities or operations. Moreover, the terms "comprise", "include" or any other variation thereof are intended to encompass a non-exclusive inclusion such that a process, method, article or device that includes a list of elements includes not only those elements, but also includes elements which are not explicitly listed or other elements inherent to such a process, method, article or device. Without further limitation, an element defined by the phrase "comprises" does not preclude presence of additional elements in a process, method, article, or device which includes the element.

In related arts, in processes of continuous high voltage ride-through and low voltage ride-through of a wind turbine, the wind turbine generally provides transient reactive power supports according to a reactive power provided before the low voltage ride-through. However, in processes of continuous high voltage ride-through and low voltage ride-through, a reactive current provided before the low voltage ride-through is of a value during transition from the high voltage ride-through to low voltage ride-through, so the reactive current may not be an actually required reactive current for a power grid. In the process of the low voltage ride-through, if the wind turbine provides a reactive current based on such reactive current, it will lead to insufficient or excessive reactive power in the process of the low voltage ride-through, which is not conducive to recovery of voltage of the power grid.

Embodiment 1

The following first describes in detail a method for controlling continuous high voltage ride-through and low voltage ride-through of a permanent magnet direct driven wind turbine according to an embodiment of the present application.

Figure 1:
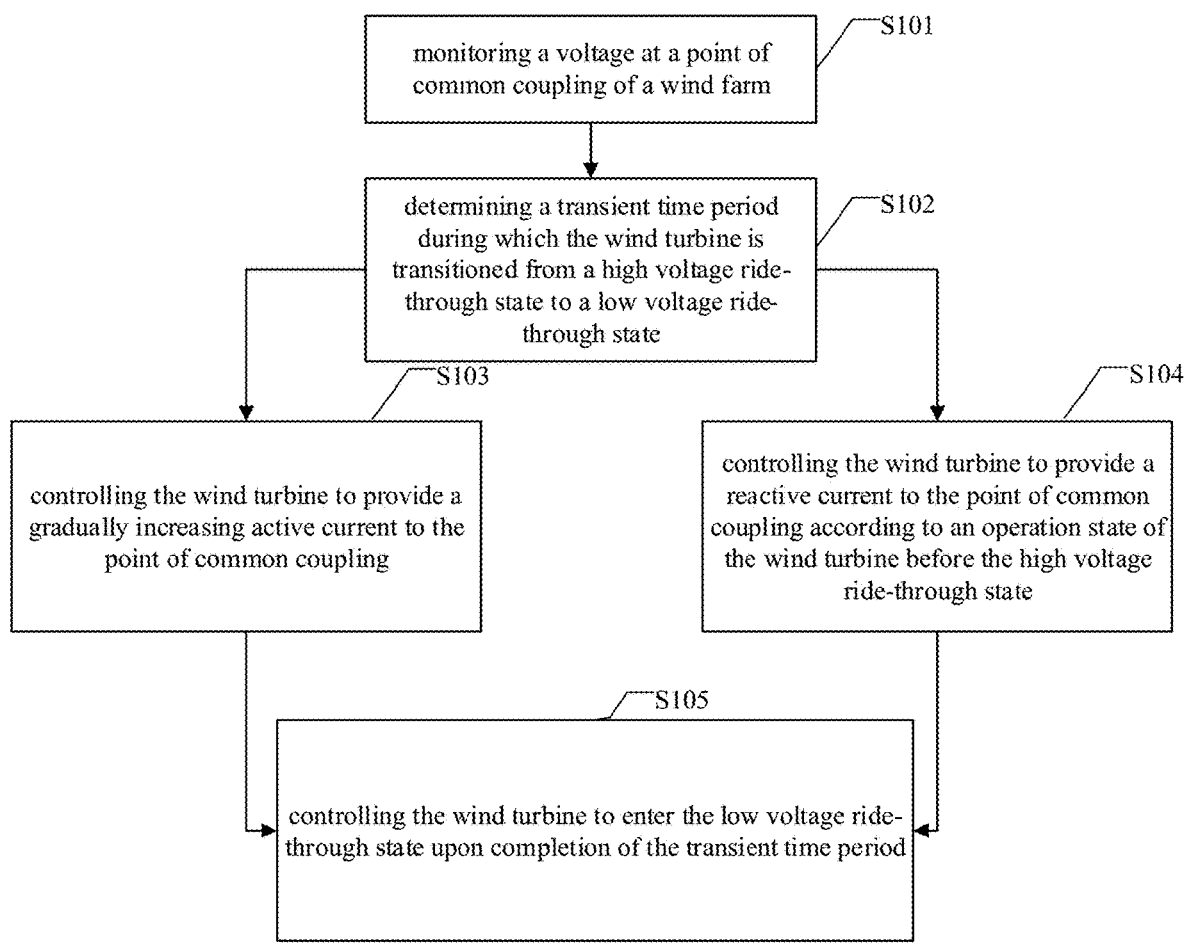
FIG. 1 shows a schematic flowchart of a method for controlling continuous high voltage ride-through and low voltage ride-through of a permanent magnet direct-driven wind turbine according to an embodiment of the present application.

FIG. 1 shows a schematic flowchart of a method for controlling continuous high voltage ride-through and low voltage ride-through of a permanent magnet direct driven wind turbine according to an embodiment of the present application. The method includes: step S101: monitoring a voltage at a point of common coupling of a wind farm; and step S102: determining a transient time period during which the wind turbine is transitioned from a high voltage ride-through state to a low voltage ride-through state, wherein a start time of the transient time period represents end of the high voltage ride-through state, and an end time of the transient time period represents start of the low voltage ride-through state.

Exemplarily, in the step S102, when the wind turbine is in the high voltage ride-through state, if the monitored voltage at the point of common coupling is decreased as compared with a voltage at the point of common coupling at beginning of the high voltage ride-through of the wind turbine and a decreased amount is not less than a preset threshold, it is determined that the transient time period begins, that is, the high voltage ride-through state ends. If the subsequently monitored voltage at the point of common coupling is decreased to a preset low voltage ride-through threshold, it is determined that the transient time period ends.

The low voltage ride-through threshold can be set according to specific application scenarios and application requirements, for example, it may be set to 0.8 pu, or it may be set to 0.9 pu.

Specifically, when a change trend of the voltage at the point of common coupling is decreasing and a decreased amount of each of three phases of voltages is not less than 0.1 pu, it is determined that the voltage of the power grid begins to decrease, and the transient time period starts. At this time, the wind turbine starts to exit the high voltage ride-through state, and a reactive current provided by the wind turbine is controlled to prevent excessive inductive reactive current provided by the wind turbine from overlapping with the gradually decreasing voltage of the power grid, thereby avoiding further decreasing of the voltage of the power grid.

The method in the embodiment further include step S103: controlling the wind turbine to provide, during the transient time period, a gradually increasing active current to the point of common coupling. During the transient time period, the voltage at the point of common coupling changes from a value higher than a standard value to a value lower than the standard value, the voltage for the power grid approaches the standard value, and the wind turbine begins to gradually recover active power.

Exemplarily, in the step S103, an active current increasing at a preset recovery rate is superimposed on an active current provided by the wind turbine to the point of common coupling in the high voltage ride-through state.

For example, if an active current provided by the wind turbine to the point of common coupling upon completion of the high voltage ride-through state is I1, then at the tth second of the transient time period, the active current provided by the wind turbine to the point of common coupling is equal to I1+at, where a is the preset recovery rate.

In an example, a rated power of the permanent magnet direct driven wind turbine is Pn, and then the preset recovery rate of the active power may be 30%*Pn/s~Pn/100 ms. For example, for a permanent magnet direct driven wind turbine with a rated power of 1.5 MW, the preset recovery rate of the active power may be 0.45 MW/s upon completion of the high voltage ride-through. That is, the above-mentioned recovery rate a may be specifically set to be 0.45 MW/s.

At step S104, the wind turbine is controlled to provide, during the transient time period, a reactive current to the point of common coupling according to an operation state of the wind turbine before the high voltage ride-through.

In the method for controlling continuous high voltage ride-through and low voltage ride-through of a permanent magnet direct driven wind turbine according to the embodiment of the present application, the wind turbine is controlled to provide a gradually increasing active current to the point of common coupling during the transient time period within which the wind turbine is transitioned from the high voltage ride-through to the low voltage ride-through, which can prevent an impact on the power grid caused by an instantaneous increase of the active power, and thus the voltage of the power grid can be effectively supported. Moreover, as an comparison, in a solution that uses a reactive current provided before the low voltage ride-through to provide reactive power supports to the power grid, since the reactive current provided before the low voltage ride-through is of a value during transition from the high voltage ride-through to the low voltage ride-through, the reactive current may not be an reactive current actually required by the power grid. Therefore, in the embodiment of the present application, the wind turbine is controlled to provide, during the transient time period, a reactive current to the point of common coupling according to an operation state of the wind turbine before the high voltage ride-through, so that a reactive current can be provided according to actual requirements of the power grid, which avoids that the voltage of the power grid cannot be recovered due to insufficient or excess reactive power for the low voltage ride-through, and therefore the voltage of the power grid can be effectively supported.

In an embodiment, the step S103 and step S104 are performed simultaneously.

Exemplarily, the step S104 includes the following three situations.

In the first situation, under a condition that the wind turbine provides a zero reactive power to the point of common coupling before the high voltage ride-through, the wind turbine is controlled to provide a zero reactive current to the point of common coupling. The zero reactive power may indicate a reactive current of 0.

In the second situation, under a condition that the wind turbine provides a capacitive reactive power to the point of common coupling before the high voltage ride-through, the wind turbine is controlled to provide a gradually increasing capacitive reactive current to the grid-connected point.

In an example, the control of the wind turbine to provide a gradually increasing capacitive reactive current to the point of common coupling in the second situation may specifically include: controlling an increase rate of the capacitive reactive current to be consistent with an increase rate of an output active power of the wind turbine, and controlling the wind turbine to provide the gradually increasing capacitive reactive current to the point of common coupling according to the increase rate of the capacitive reactive current.

For example, the capacitive reactive current may have an initial value of Ip*tgØ at the beginning of the transient time period, and changes according to the recovery rate of the active power as described in the step S103, thereby keeping a power factor unchanged. The Ip denotes the active current provided by the wind turbine to the point of common coupling during the high voltage ride-through, and the angle Ø denotes a power factor angle before a fault of the high voltage ride-through.

In processes of continuous high voltage ride-through and low voltage ride-through in related arts, the recovery rate of the reactive power generally does not consider the recovery rate of the active power during transition from the high voltage ride-through to the low voltage ride-through (the voltage at the point of common coupling is at a rated voltage ranging from 1.1 pu to 0.9 pu). The wind turbine will enter, due to its own improper control rather than due to failure in the power grid, a secondary low voltage ride-through state or directly enter a high voltage ride-through, which may even result in failure of the low voltage ride-through caused by subsequent failure in the power grid. In the present example, by controlling, during the transient time period, the recovery rate of the reactive power to be consistent with the recovery rate of the active power and controlling the power factor angle to be consistent with that before failure of the high voltage ride-through, a coordinated steady state of the reactive and the active power before failure of the high voltage ride-through can be maintained during transition from the high voltage ride-through to the low voltage ride-through.

Optionally, in the second situation, under a condition that the wind turbine provides a capacitive reactive power to the point of common coupling, the wind turbine is controlled to provide a capacitive current to the grid-connected point, wherein the provided capacitive reactive power is the same as a capacitive reactive current of the wind turbine before the high voltage ride-through In the third situation, under a condition that the wind turbine provides an inductive reactive power to the point of common coupling before the high voltage ride-through, the wind turbine is controlled to provide an inductive reactive current to the grid-connected point, wherein the provided inductive reactive current is the same as an inductive reactive current of the wind turbine before the high voltage ride-through.

As shown in FIG. 1, after the step S103 and step S104, the method may further include step S105: controlling the wind turbine to enter, upon completion of the transient time period, the low voltage ride-through and to provide a capacitive reactive power to the point of common coupling according to a degree of decrease of the voltage at the point of common coupling and a reactive power of the wind turbine before the high voltage ride-through.

For example, the wind turbine is controlled to enter the low voltage ride-through state, and to provide a capacitive reactive current according to the degree of decrease of the voltage in connection with the reactive power before the high voltage ride-through (that is, based on the reactive power before the high voltage ride-through) to support rapid recovery of voltage of the power grid.

For example, in the low voltage ride-through state, the reactive current provided by the wind turbine may be $I_q = I_{r0} + I_r$, where $I_{r0}$ denotes a positive-sequence reactive current before failure of the high voltage ride-through, and $I_r$ denotes a reactive current calculated according to a change in voltage during failure of the low voltage ride-through.

$$I_r = k * \frac{U_0 - U_{pos}}{U_n} * I_n,$$

where $U_n$ denotes a rated voltage, $U_{pos}$ denotes a positive sequence voltage component during failure of the low voltage ride-through, $U_0$ denotes a voltage value before failure of the low voltage ride-through, $I_n$ denotes a rated current; $I_{r0}$, which denotes a reactive current before failure of the high voltage ride-through, may be an average of reactive currents before the failure; and the factor k may be 2.

Figure 2:
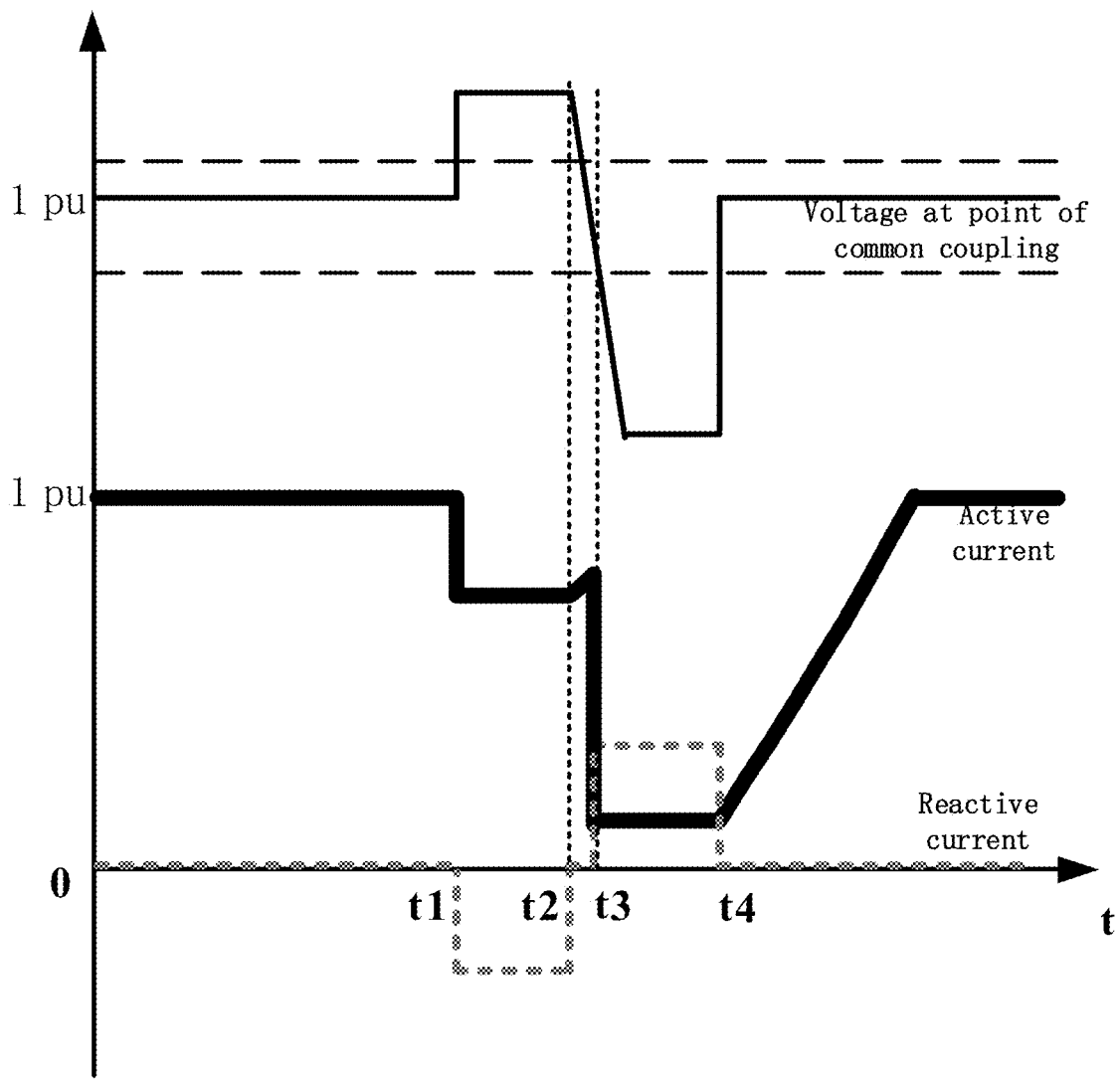
FIG. 2 shows a schematic diagram of active current and reactive current under a condition that a wind turbine is controlled to provide a zero reactive power before the high voltage ride-through according to an embodiment of the present application.

For the above-mentioned first situation, FIG. 2 shows a schematic diagram of active current and reactive current under a condition that a permanent magnet direct driven wind turbine is controlled to provide a zero reactive power before the high voltage ride-through.

As shown in FIG. 2, from the curves representing changes in the voltage at the point of common coupling, it can be determined that at time t1, the wind turbine starts to enter the high voltage ride-through state; from time 2 to time t3, a transient time period during which the wind turbine is transitioned from the high voltage ride-through state to the low voltage ride-through state; at the time t3, the wind turbine starts to enter the low voltage ride-through state, and at time t4, the low voltage ride-through state ends.

Before the time t1, that is, before the high voltage ride-through, the wind turbine provides a zero reactive power. From the t1 to the time t2, the wind turbine provides an inductive reactive current to the point of common coupling to support recovery of voltage of the power grid, and provides a decreasing active current to the point of common coupling to keep the power grid connected. From the time t2 to the time t3, the wind turbine provides a zero reactive current to the point of common coupling, which is consistent with that before the high voltage ride-through, thereby preventing the inductive reactive power provided by the wind turbine from being superimposed on the low voltage state of the power grid at the time t3 in order to keep the voltage of the power grid stable. From the time t2 to the time t3, the voltage at the point of common coupling approaches to a standard value, and the active power of the wind turbine begins to recover, resulting in a gradually increasing active current. From the time t3 to the time t4, the wind turbine provides a capacitive reactive current to the point of common coupling to support recovery of voltage of the power grid, and the active power is further decreased.

Figure 3:
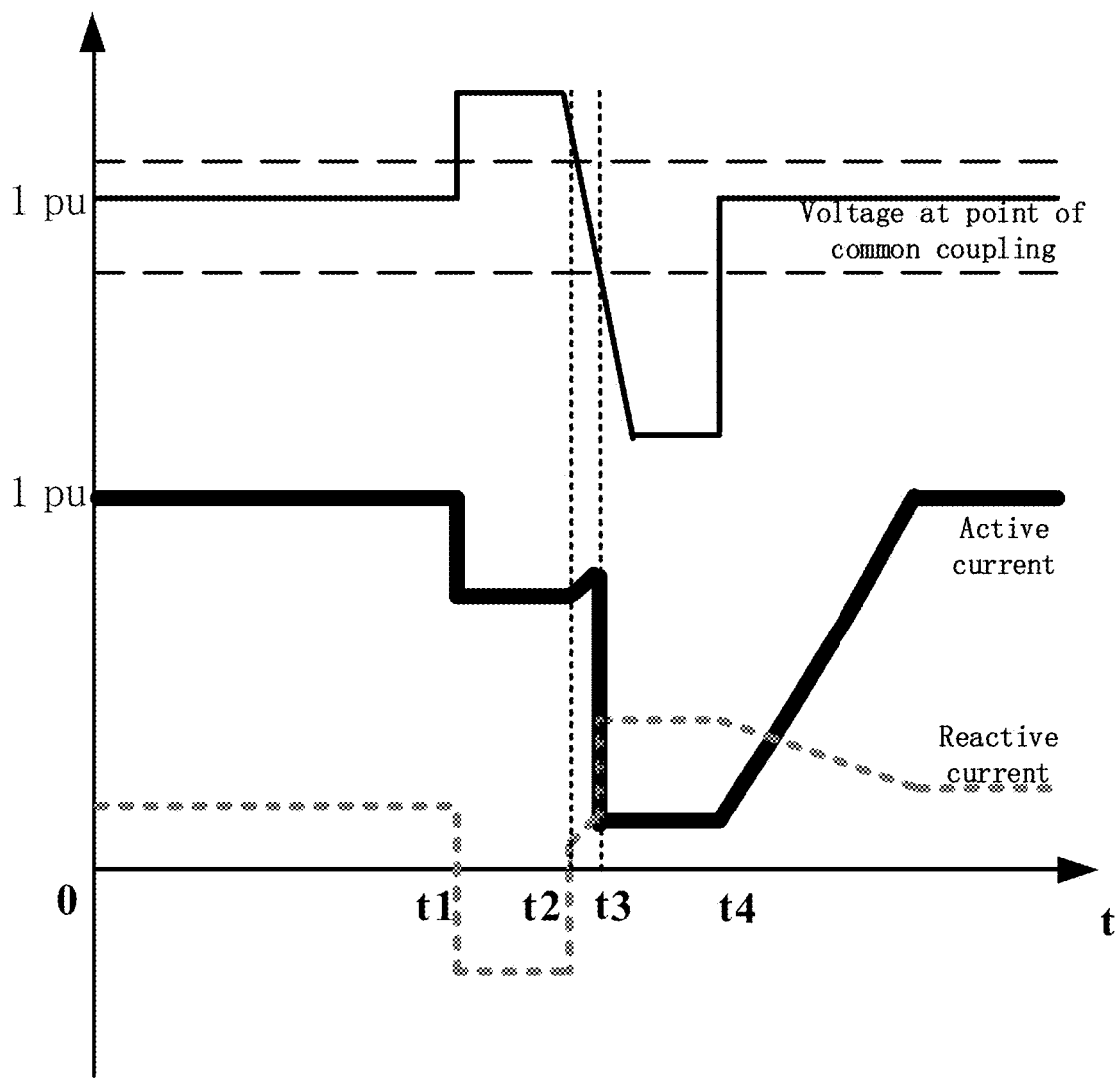
FIG. 3 shows a schematic diagram of active current and reactive current under a condition that a wind turbine is controlled to provide a capacitive reactive power before the high voltage ride-through according to an embodiment of the present application.

For the above-mentioned second situation, FIG. 3 shows a schematic diagram of changes of active current and reactive current under a condition that a permanent magnet direct driven wind turbine is controlled to provide a capacitive reactive power before the high voltage ride-through.

As shown in FIG. 3, from the curves representing changes in the voltage at the point of common coupling, it can be determined that at time t1, the wind turbine starts to enter the high voltage ride-through state; from time 2 to time t3, a transient time period during which the wind turbine is transitioned from the high voltage ride-through state to the low voltage ride-through state; at the time t3, the wind turbine starts to enter the low voltage ride-through state, and at time t4, the low voltage ride-through state ends.

Before the time t1, that is, before the high voltage ride-through, the wind turbine provides a capacitive reactive power. From the t1 to the time t2, the wind turbine provides an inductive reactive current to the point of common coupling to support recovery of voltage of the power grid, and provides a decreasing active current to the point of common coupling to keep the power grid connected. From the time t2 to the time t3, the wind turbine provides an increasing capacitive reactive current instead of the inductive reactive current to the point of common coupling to prevent the inductive reactive power provided by the wind turbine from being superimposed on the low voltage state of the power grid at the time t3. From the time t2 to the time t3, the voltage at the point of common coupling approaches to a standard value, and the active power of the wind turbine begins to recover, resulting in a gradually increasing active current and a slop of the increasing reactive power is consistent with that of the increasing active current in order not to cause an disturbance to the power grid by the reactive power. From the time t3 to the time t4, the wind turbine provides a capacitive reactive current to the point of common coupling to support recovery of voltage of the power grid, and the active current is further decreased.

Figure 4:
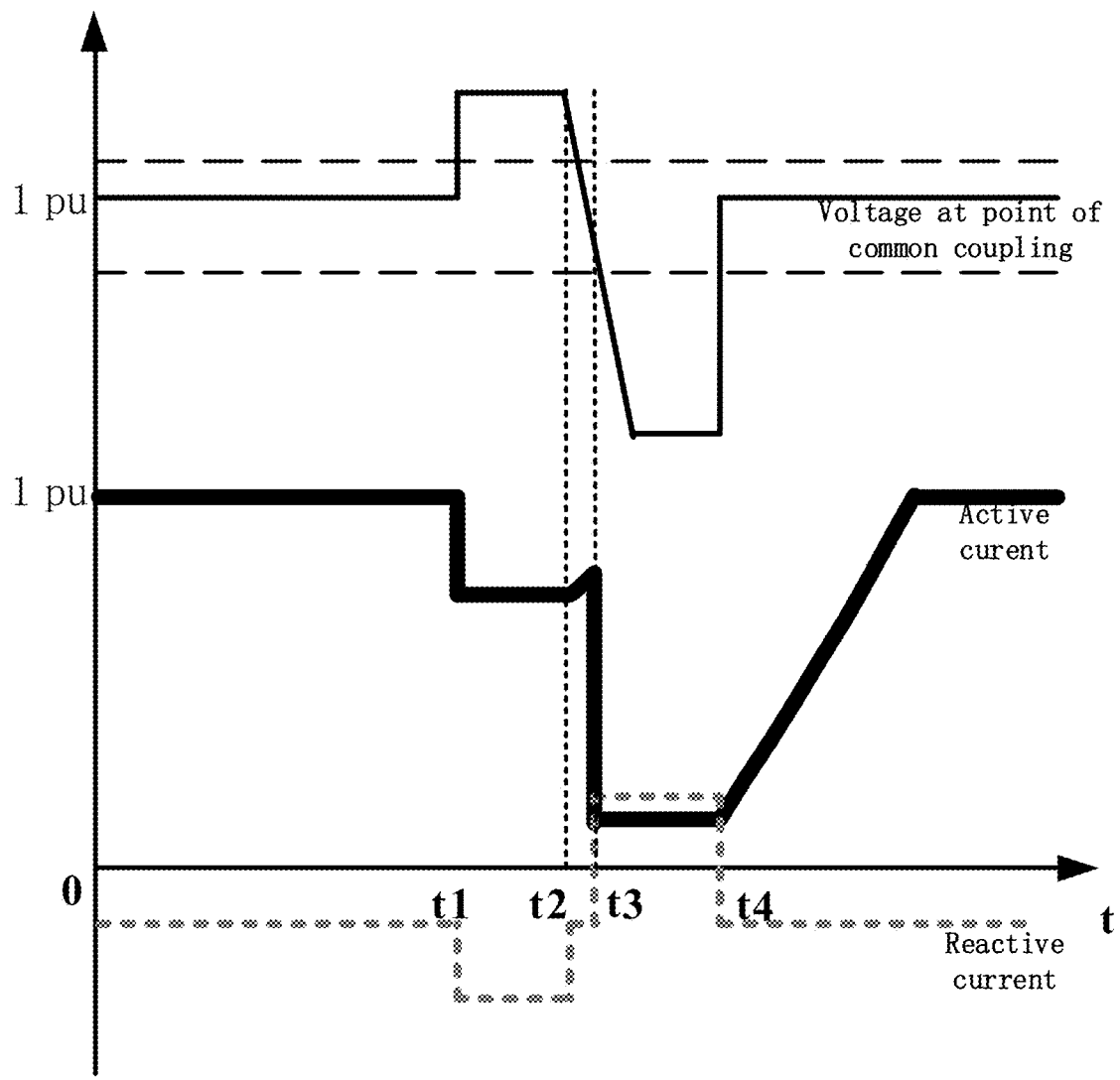
FIG. 4 shows a schematic diagram of active current and reactive current under a condition that a wind turbine is controlled to provide an inductive reactive power before the high voltage ride-through according to an embodiment of the present application.

For the above-mentioned third situation, FIG. 4 shows a schematic diagram of active current and reactive current under a condition that a permanent magnet direct driven wind turbine is controlled to provide an inductive reactive power before the low voltage ride-through.

As shown in FIG. 4, from the curves representing changes in the voltage at the point of common coupling, it can be determined that at time t1, the wind turbine starts to enter the high voltage ride-through state; from time 2 to time t3, it is a transient time period during which the wind turbine is transitioned from the high voltage ride-through state to the low voltage ride-through state; at the time t3, the wind turbine starts to enter the low voltage ride-through state, and at time t4, the low voltage ride-through state ends.

Before the time t1, that is, before the high voltage ride-through, the wind turbine provides an inductive reactive power. From the t1 to the time t2, the wind turbine provides an increasing inductive reactive current to the point of common coupling to support recovery of voltage of the power grid, and provides a decreasing active current to the point of common coupling to keep the power grid connected. At the time t2, there occurs a step change in the inductive reactive current provided by the wind turbine to the inductive reactive power before the high voltage ride-through. From the time t2 to the time t3, the wind turbine provides an inductive reactive current to the point of common coupling. From the time t2 to the time t3, the voltage at the point of common coupling approaches to a standard value, and the active power of the wind turbine begins to recover, resulting in a gradually increasing active current. From the time t3 to the time t4, the wind turbine provides a capacitive reactive current to the point of common coupling to support recovery of voltage of the power grid, and the active power is further reduced.

In the method for controlling continuous high voltage ride-through and low voltage ride-through of a permanent magnet direct driven wind turbine according to the embodiment of the present application, the wind turbine is controlled to exit the high voltage ride-through state in time before entering the low voltage ride-through state, so as to avoid incapability of withdrawing the inductive reactive power provided during the high voltage ride-through in time, which would otherwise cause deterioration of the voltage of the power grid due to the inductive reactive power still being provided while the power grid having a lower voltage. During the state transition from the high voltage ride-through to the low voltage ride-through, the recovery rate of reactive power is controlled to be matched with that of active power in order to avoid disturbance of the reactive power to the power grid upon completion of the high voltage ride-through if the wind turbine was still in the state at which it outputs the reactive power. During the low voltage ride-through, the wind turbine outputs a reactive current according to a degree of decrease of the voltage in connection with the reactive power state before the high voltage ride-through state (that is, based on the reactive power before the high voltage ride-through) to support rapid recovery of voltage of the power grid.

Embodiment 2

The following describes a system for controlling continuous high voltage ride-through and low voltage ride-through of a permanent magnet direct driven wind turbine according to an embodiment of the present application.

Figure 5:
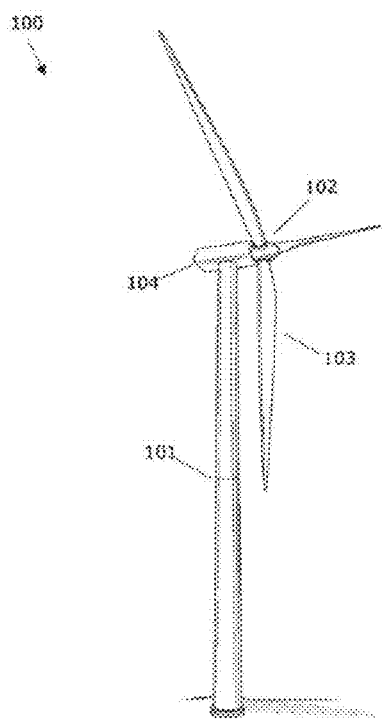
FIG. 5 shows a schematic structural diagram of a wind turbine according to an embodiment of the present application.

FIG. 5 is a schematic structural diagram of a wind turbine 100. The wind turbine 100 includes a tower 101 and an impeller 102, wherein the impeller 102 has at least one blade 103, for example, three blades. The impeller 102 is connected to a nacelle 104 mounted on top of the tower 101 and drives a generator via a drive system. The impeller 102 can be rotated by wind. The energies resulted from rotation of the rotor blades 103 caused by wind are transferred to the generator via a shaft. Thus, the wind turbine 100 is able to convert kinetic energies of the wind into mechanical energies by using the rotor blades, and then the mechanical energies can be converted into electrical energies by the generator. The generator is connected with a converter, which includes a machine-side converter and a grid-side converter. The machine-side converter converts an alternative current from the generator to a direct current, and the grid-side converter converts the direct current to an alternative current for injection into a utility power grid via a transformer of the wind turbine 100. In an example, the wind turbine may be a permanent magnet direct driven wind turbine.

Figure 6:
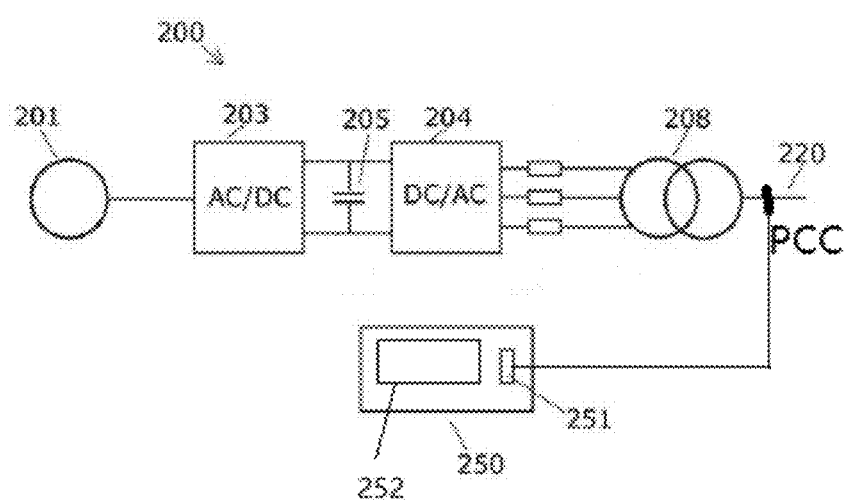
FIG. 6 shows a schematic diagram of a power conversion system of a permanent magnet direct-driven wind turbine according to an embodiment of the present application.

FIG. 6 is a schematic diagram of a power conversion system of a permanent magnet direct driven wind turbine. The power conversion system 200 includes a generator 201, a machine-side converter (AC/DC) 203, a grid-side converter (DC/AC) 204 and a direct current (DC) link 205. The DC link 205 includes one or more DC link capacitors which are charged by DC output current from the generator and provide a direct current to the grid-side converter 204. The alternative current output from the grid-side converter 204 is provided to the power grid 220 via a grid transformer 208. A connection point between the grid transformer 208 and the power grid 220 is defined as a point of common coupling (Point of Common Coupling, PCC) of the wind farm.

FIG. 6 also shows a control system 250 for controlling continuous high voltage ride-through and low voltage ride-through of the permanent magnet direct driven wind turbine. The control system 250 includes: a monitoring module 251 configured to monitor a voltage at a point of common coupling of a wind farm; and a controller 252 in communication with the monitoring module 251, wherein the controller 252 is configured to determine a transient time period during which the wind turbine is transitioned from a high voltage ride-through state to a low voltage ride-through state; control the wind turbine to provide, during the transient time period, a gradually increasing active current to the point of common coupling; and control the wind turbine to provide, during the transient time period, a reactive current to the point of common coupling according to an operation state of the wind turbine before the high voltage ride-through.

In an example, the controller 252 may control the above-described power conversion system to implement the continuous high voltage ride-through and low voltage ride-through.

In an example, the controller 252 may be specifically configured to: superimpose an active current increasing at a preset recovery rate on an active current provided by the wind turbine to the point of common coupling in the high voltage ride-through state.

In an example, the controller 252 may be specifically configured to: control the wind turbine to provide a zero reactive current to the point of common coupling under a condition that the wind turbine provides a zero reactive power to the point of common coupling before the high voltage ride-through; control the wind turbine to provide a gradually increasing capacitive reactive current to the point of common coupling under a condition that the wind turbine provides a capacitive reactive power to the point of common coupling before the high voltage ride-through; and control the wind turbine to provide a step change to an inductive reactive current before the high voltage ride-through to the point of common coupling under a condition that the wind turbine provides an inductive reactive power to the point of common coupling before the high voltage ride-through.

In an example, the controller 252 may be specifically configured to: control an increase rate of the capacitive reactive current to be consistent with an increase rate of an output active power of the wind turbine; and control the wind turbine to provide the gradually increasing capacitive reactive current to the point of common coupling according to the increase rate of the capacitive reactive current.

In an example, the controller 252 may further be configured to: determine that the transient time period begins if the monitored voltage at the point of common coupling is decreased as compared with a voltage at the point of common coupling at beginning of the high voltage ride-through of the wind turbine and a decreased amount is not less than a preset threshold; and determine that the transient time period ends if the monitored voltage at the point of common coupling is decreased to a preset low voltage ride-through threshold.

In an example, the controller 252 may further be configured to: control the wind turbine to enter the low voltage ride-through state upon completion of the transient time period, and to provide a capacitive reactive power to the point of common coupling according to a degree of decrease of the voltage at the point of common coupling and a reactive power of the wind turbine before the high voltage ride-through.

It should be understood that the present application is not limited to the specific configurations and processes described above and illustrated in the figures. For sake of brevity, detailed descriptions of known methods are omitted here. In the above-described embodiments, several specific steps are described and shown as examples. However, the method process of the present application is not limited to the specific steps described and shown, and those skilled in the art can make various changes, modifications and additions, or change the sequence of steps after understanding the spirit of the present application.

The functional blocks shown in the above-described structural block diagrams may be implemented as hardware, software, firmware, or a combination thereof. When implemented in hardware, it may be, for example, an electronic circuit, an application specific integrated circuit (ASIC), suitable firmware, a plug-in, a function card, or the like. When implemented in software, elements of the present application may be programs or code segments for performing the required tasks. The program or code segments may be stored in a machine-readable medium or transmitted over a transmission medium or communication link by a data signal carried in a carrier wave.

The embodiments of the present application further provide a computer-readable storage medium having computer program instructions stored thereon, and the computer program instructions, when executed by a processor, implement the method according to the first embodiment. A "machine-readable medium" may include any medium that can store or transmit information. Examples of the machine-readable medium include an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and the like. The code segments may be downloaded via a computer network such as the Internet, an intranet, or the like. According to an embodiment of the present application, the computer-readable storage medium may be a non-transitory computer-readable storage medium.

It should also be noted that the exemplary embodiments mentioned in this application describe some methods or systems based on a series of steps or devices. However, the present application is not limited to the order of the above steps, that is, the steps may be performed in the order mentioned in the embodiments, or may be performed in a different order from that described in the embodiments, or several steps may be performed simultaneously.

The above descriptions are only specific implementations of the present application. Those skilled in the art can clearly understand that, for convenience and brevity of description, specific operations of the above-described systems, modules and units may refer to those in the foregoing method embodiments and will not be repeated here. It should be understood that the protection scope of the present application is not limited to the embodiments, and those skilled in the art can easily think of various equivalent modifications or replacements within the technical scope disclosed in the present application, and these modifications or replacements should all fall within the protection scope of the present application.

The invention claimed is:

1. A method for controlling continuous high voltage ride-through and low voltage ride-through of a permanent magnet direct-driven wind turbine, comprising:

monitoring a voltage at a point of common coupling of a wind farm;

determining a transient time period during which the wind turbine is transitioned from a high voltage ride-through state to a low voltage ride-through state;

controlling the wind turbine to provide, during the transient time period, an active current to the point of common coupling, the active current being gradually increasing from a first level at which the wind turbine provides during the high voltage-through state;

controlling the wind turbine to provide, during the transient time period, a reactive current to the point of common coupling according to an operation state of the wind turbine before the high voltage ride-through state; and controlling the wind turbine to reduce, at the end of the transient time period, the active current to a second level lower than the first level.

2. The method according to claim 1, wherein the controlling the wind turbine to provide, during the transient time period, the active current to the point of common coupling comprises:

superimposing a transient active current increasing at a preset recovery rate on an active current provided by the wind turbine to the point of common coupling in the high voltage ride-through state.

3. The method according to claim 1, wherein the controlling the wind turbine to provide, during the transient time period, the reactive current to the point of common coupling according to the operation state of the wind turbine before the high voltage ride-through state comprises:

controlling the wind turbine to provide a zero reactive current to the point of common coupling under a condition that the wind turbine provides a zero reactive power to the point of common coupling before the high voltage ride-through state;

controlling the wind turbine to provide a gradually increasing capacitive reactive current to the point of common coupling under a condition that the wind turbine provides a capacitive reactive power to the point of common coupling before the high voltage ride-through state;

controlling the wind turbine to provide an inductive reactive current to the point of common coupling under a condition that the wind turbine provides an inductive reactive power to the point of common coupling before the high voltage ride-through state, wherein the provided inductive reactive current is the same as an inductive reactive current of the wind turbine before the high voltage ride-through state.

4. The method according to claim 3, wherein the controlling the wind turbine to provide the gradually increasing capacitive reactive current to the point of common coupling comprises:

controlling an increase rate of the capacitive reactive current to be consistent with an increase rate of an output active power of the wind turbine; and controlling the wind turbine to provide the gradually increasing capacitive reactive current to the point of common coupling according to the increase rate of the capacitive reactive current.

5. The method according to claim 1, wherein the determining the transient time period during which the wind turbine is transitioned from the high voltage ride-through state to the low voltage ride-through state comprises:

determining that the transient time period begins if the monitored voltage at the point of common coupling is decreased as compared with a voltage at the point of common coupling at beginning of the high voltage ride-through state of the wind turbine and a decreased amount is not less than a preset threshold; and determining that the transient time period ends if the monitored voltage at the point of common coupling is decreased to a preset low voltage ride-through threshold.

6. The method according to claim 1, further comprising:

controlling the wind turbine to enter the low voltage ride-through state upon completion of the transient time period, and to provide a capacitive reactive power to the point of common coupling according to a degree of decrease of the voltage at the point of common coupling and a reactive power of the wind turbine before the high voltage ride-through state.

7. A system for controlling continuous high voltage ride-through and low voltage ride-through of a permanent magnet direct-driven wind turbine, comprising:

a monitoring module configured to monitor a voltage at a point of common coupling of a wind farm; and a controller configured to:

determine a transient time period during which the wind turbine is transitioned from a high voltage ride-through state to a low voltage ride-through state;

control the wind turbine to provide, during the transient time period, an active current to the point of common coupling, the active current being gradually increasing from a first level at which the wind turbine provides during the high voltage-through state;

control the wind turbine to provide, during the transient time period, a reactive current to the point of common coupling according to an operation state of the wind turbine before the high voltage ride-through; and control the wind turbine to reduce, at the end of the transient time period, the active current to a second level lower than the first level.

8. The system according to claim 7, wherein the controller is further configured to superimpose a transient active current increasing at a preset recovery rate on an active current provided by the wind turbine to the point of common coupling in the high voltage ride-through state.

9. The system according to claim 7, wherein the controller is further configured to:
control the wind turbine to provide a zero reactive current to the point of common coupling under a condition that the wind turbine provides a zero reactive power to the point of common coupling before the high voltage ride-through state;
control the wind turbine to provide a gradually increasing capacitive reactive current to the point of common coupling under a condition that the wind turbine provides a capacitive reactive power to the point of common coupling before the high voltage ride-through state; or
control the wind turbine to provide an inductive reactive current to the point of common coupling under a condition that the wind turbine provides an inductive reactive power to the point of common coupling before the high voltage ride-through state, wherein the provided inductive reactive current is the same as an inductive reactive current of the wind turbine before the high voltage ride-through state.

10. The system according to claim 9, wherein the controller is further configured to:
control an increase rate of the capacitive reactive current to be consistent with an increase rate of an output active power of the wind turbine; and
control the wind turbine to provide the gradually increasing capacitive reactive current to the point of common coupling according to the increase rate of the capacitive reactive current.

11. The system according to claim 7, wherein the controller is further configured to:
determine that the transient time period begins if the monitored voltage at the point of common coupling is decreased as compared with a voltage at the point of common coupling at beginning of the high voltage ride-through state of the wind turbine and a decreased amount is not less than a preset threshold; and
determine that the transient time period ends if the monitored voltage at the point of common coupling is decreased to a preset low voltage ride-through threshold.

12. The system according to claim 7, wherein the controller is further configured to:
control the wind turbine to enter the low voltage ride-through state upon completion of the transient time period, and to provide a capacitive reactive power to the point of common coupling according to a degree of decrease of the voltage at the point of common coupling and a reactive power of the wind turbine before the high voltage ride-through state.

13. A non-transitory computer-readable storage medium having computer program instructions stored thereon, wherein the computer program instructions, when executed by a processor, implement a method for controlling continuous high voltage ride-through and low voltage ride-through of a permanent magnet direct-driven wind turbine, the method comprising:
monitoring a voltage at a point of common coupling of a wind farm;
determining a transient time period during which the wind turbine is transitioned from a high voltage ride-through state to a low voltage ride-through state;
controlling the wind turbine to provide, during the transient time period, an active current to the point of common coupling, the active current being gradually increasing from a first level at which the wind turbine provides during the high voltage-through state;
controlling the wind turbine to provide, during the transient time period, a reactive current to the point of common coupling according to an operation state of the wind turbine before the high voltage ride-through state; and
controlling the wind turbine to reduce, at the end of the transient time period, the active current to a second level lower than the first level.

14. The non-transitory computer-readable storage medium according to claim 13, wherein controlling the wind turbine to provide, during the transient time period, the active current to the point of common coupling comprises:
superimposing a transient active current increasing at a preset recovery rate on an active current provided by the wind turbine to the point of common coupling in the high voltage ride-through state.

15. The non-transitory computer-readable storage medium according to claim 13, wherein controlling the wind turbine to provide, during the transient time period, the reactive current to the point of common coupling according to the operation state of the wind turbine before the high voltage ride-through state comprises:
controlling the wind turbine to provide a zero reactive current to the point of common coupling under a condition that the wind turbine provides a zero reactive power to the point of common coupling before the high voltage ride-through state;
controlling the wind turbine to provide a gradually increasing capacitive reactive current to the point of common coupling under a condition that the wind turbine provides a capacitive reactive power to the point of common coupling before the high voltage ride-through state; or
controlling the wind turbine to provide an inductive reactive current to the point of common coupling under a condition that the wind turbine provides an inductive reactive power to the point of common coupling before the high voltage ride-through state, wherein the provided inductive reactive current is the same as an inductive reactive current of the wind turbine before the high voltage ride-through state.

16. The non-transitory computer-readable storage medium according to claim 15, wherein controlling the wind turbine to provide the gradually increasing capacitive reactive current to the point of common coupling comprises:
controlling an increase rate of the capacitive reactive current to be consistent with an increase rate of an output active power of the wind turbine; and
controlling the wind turbine to provide the gradually increasing capacitive reactive current to the point of common coupling according to the increase rate of the capacitive reactive current.

17. The non-transitory computer-readable storage medium according to claim 13, wherein determining the transient time period during which the wind turbine is transitioned from the high voltage ride-through state to the low voltage ride-through state comprises:

determining that the transient time period begins if the monitored voltage at the point of common coupling is decreased as compared with a voltage at the point of common coupling at beginning of the high voltage ride-through state of the wind turbine and a decreased amount is not less than a preset threshold; and determining that the transient time period ends if the monitored voltage at the point of common coupling is decreased to a preset low voltage ride-through threshold.

18. The non-transitory computer-readable storage medium according to claim 13, wherein the method further comprises:

controlling the wind turbine to enter the low voltage ride-through state upon completion of the transient time period, and to provide a capacitive reactive power to the point of common coupling according to a degree of decrease of the voltage at the point of common coupling and a reactive power of the wind turbine before the high voltage ride-through state.

* * * * *